Oct. 28, 1941.  L. BONHAM  2,260,769
STOKER SHEAR PIN ALARM
Filed July 13, 1940
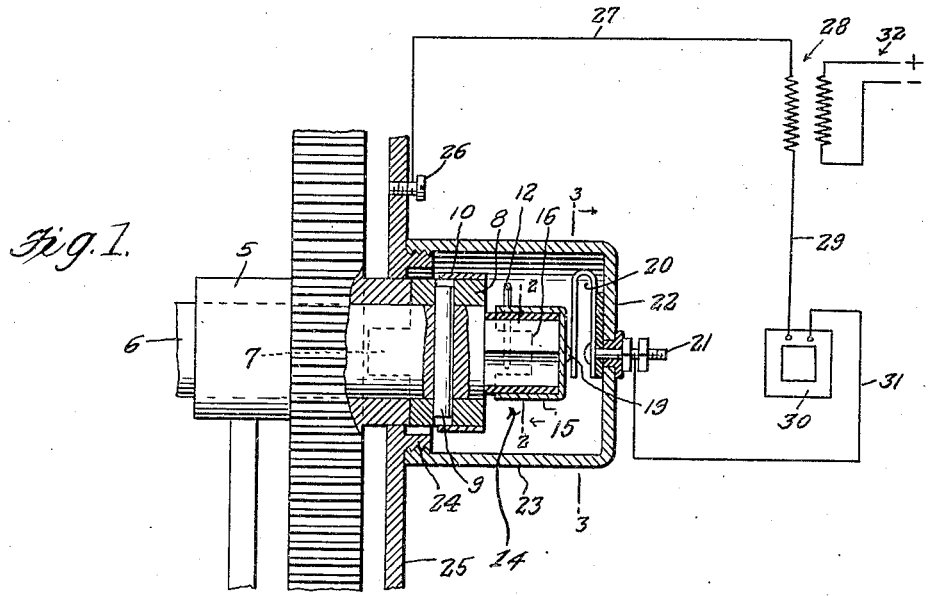
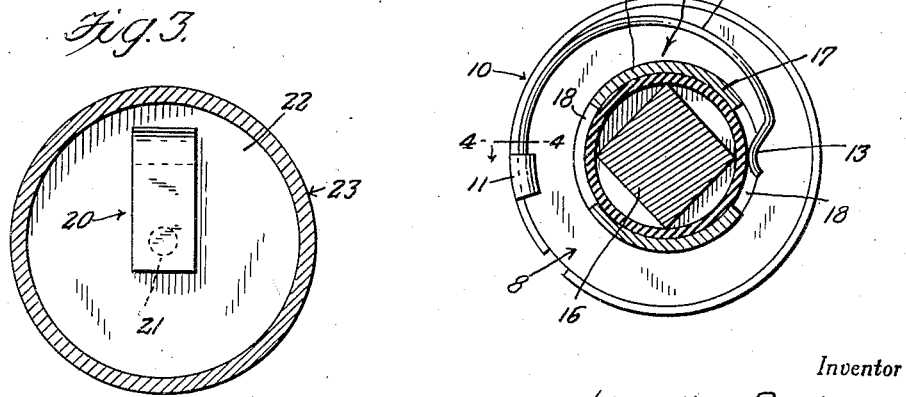
Inventor
Llewellyn Bonham
By Clarence A. O'Brien
Attorneys Patented Oct. 28, 1941

2,260,769

UNITED STATES PATENT OFFICE 2,260,769

STOKER SHEAR PIN ALARM

Llewellyn Bonham, Oxford, Ohio

Application July 13, 1940, Serial No. 345,386

3 Claims. (Cl. 200—52)

My invention relates to improvements in alarm means comprising switch means set in operation by the shearing of the shear pin in an automatic coal stoker, and the primary object of the invention is to provide a simple and inexpensive arrangement of this kind which is characterized by easy removal and replacement without the use of tools, and by complete electrical independence from the subsisting stoker control circuits.

Other important objects and advantages of my invention will be apparent from a reading of the following description and the appended drawing wherein a preferred embodiment of the invention is shown for illustrative purposes.

In the drawing:

Figure 1 is a side elevational and longitudinal sectional view of the embodiment showing diagrammatically the electrical connections to the warning signal device and an independent source of operating current.

Figure 2 is an enlarged transverse vertical sectional view taken through Figure 1 approximately on the line 2—2 and looking toward the left.

Figure 3 is an enlarged transverse vertical sectional view taken through Figure 1 approximately on the line 3—3 and looking toward the right in the direction of the arrow.

Figure 4 is a fragmentary enlarged horizontal sectional view taken through Figure 2 approximately on the line 4—4.

Referring in detail to the drawing, the numeral 5 designates the tubular driven shaft of the stoker which turns on the drive shaft 6 except when the lugs 7 on the shear pin collar 8 are engaged in the accommodating notches in the end of the tubular driven shaft, and the shear pin collar is prevented from sliding and turning on the shaft 6 by the shear pin 9 which extends through the shaft 6 and has its opposite ends projecting into openings formed in the shear pin collar. Whenever the conveyor (not shown) of the stoker meets with a substantial obstruction sufficient torque is imposed on the shafts 5 and 6 in opposite directions to effect protective shearing of the shear pin 9 in a manner well known in the art.

In accordance with the present invention a flat spring expansible ring 10 is sufficiently tightly telescoped on the shear pin collar 8 to preclude relative rotation. The ring has a laterally and radially inwardly projecting bracket 11, preferably in the form of a tab on the edge of the ring rolled into the form shown in Figure 4 and gripping one end of an arcuate spring contact 12, suitably in the form of a heavy wire having its free end radially inwardly deflected and curved at 13 for tensioned engagement with the surfaces presented by the periphery of the capsule 14.

The capsule 14 comprises a cylindrical metal cup-shaped body 15 having a tubular dielectric lining 17 riding frictionally on the corners of the reduced squared portion 16 on the shaft 6 with the lining 17 abutting the adjacent end of the shear pin collar. The body 15 is provided in its free edge with circumferentially spaced openings 18 which expose underlying portions of the surface of the dielectric lining to engagement by the portion 13 of the spring contact arm 12. The capsule 14 and the ring 10 are so adjusted that while the shear pin 9 is intact and in place the spring contact arm will engage only the dielectric surface exposed by one of the openings 18 and be out of contact with the body 15, but in engagement and electrical contact with the metal body whenever, as a result of shearing of the pin, relative rotation takes place between the shafts 5 and 6 and hence between the ferrule 14 and the spring ring 10 and its contact arm 12. As the capsule rotates relative to the spring contact arm 12, the electrical contact of the contact arm and the metal body is broken at intervals and by the intermittent insulation of the contact arm by its engagement with the dielectric portions exposed by the openings 18.

The metal body 15 has a central contact 19 on its closed end with which is electrically engaged the extremity of one arm of a U-shaped spring 20 which has its other arm secured to an insulated binding post 21 which passes through the end 22 of a cup-shaped housing 23. This threadably mounts on a threaded flange 24 on a supporting wall 25, whereby the mechanism described is protectively enclosed. A stud 26 may suitably act as a binding post for grounding the wire 27 which leads to one side of the output of a step-down transformer 28 with the remaining side connected by the wire 29 with one side of a suitable electric alarm device 30. The remaining side of the alarm device is connected by the wire 31 with the binding post 21 on the housing 23. A suitable current source 32 energizes the transformer 28.

Although I have shown and described herein a preferred embodiment of my invention, it is to be definitely understood that I do not wish to limit the application of the invention thereto except as may be required by the scope of the subjoined claims.

Having described the invention, what is claimed as new is:

1. In combination, a drive shaft, a tubular driven shaft in which the drive shaft can turn, a shear pin collar on said drive shaft, a shear pin traversing said drive shaft and said shear pin collar, said collar having means to connectively engage said tubular driven shaft, a spring clamp ring snugged on said shear pin collar, a circumferentially extending spring contact on said clamp ring projecting alongside said clamp ring, a capsule comprising a dielectric body mounted on a portion of said drive shaft and insulated from said portion, and a discontinuous conductive annulus on said body and on which the free end of said spring contact bears, whereby upon shearing of the shear pin and consequent relative rotation of the drive and driven shafts said spring contact will alternately engage said annulus and portions of said dielectric body exposed by discontinuous portions of said conductive annulus.

2. The combination recited by claim 1 wherein said conductive annulus includes a stationary contact located axially with respect thereto, a yieldable contact engaged by said stationary contact, and a support on which said yieldable contact is mounted and from which it is insulated.

3. The combination recited by claim 1 wherein said conductive annulus includes a stationary contact located axially with respect thereto, a yieldable contact engaged by said stationary contact, and a support on which said yieldable contact is mounted and from which it is insulated, said support comprising a housing enclosing said capsule, said shear pin collar and said spring clamp ring and adjacent portions of said shafts.

LLEWELLYN BONHAM.